(12) United States Patent
Provost

(10) Patent No.: US 7,907,661 B2
(45) Date of Patent: Mar. 15, 2011

(54) TESTABILITY TECHNIQUE FOR PHASE INTERPOLATORS

(75) Inventor: Benoit Provost, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 11/940,205

(22) Filed: Nov. 14, 2007

(65) Prior Publication Data

US 2009/0122849 A1 May 14, 2009

(51) Int. Cl.
*H04B 3/46* (2006.01)

(52) U.S. Cl. ........ 375/226; 375/224; 375/373; 375/375; 375/376; 370/229; 370/230; 370/231; 370/232; 370/233; 370/234; 370/235; 327/141; 327/175

(58) Field of Classification Search .................. 375/226, 375/224, 373, 375, 376; 370/229, 230, 231, 370/232, 233, 234, 235; 327/141, 175
See application file for complete search history.

(56) References Cited

U.S. PATENT DOCUMENTS

| 2004/0066873 A1* | 4/2004 | Cho et al. ...................... 375/376 |
| 2006/0181319 A1* | 8/2006 | Zhang ........................... 327/158 |
| 2009/0122849 A1* | 5/2009 | Provost ......................... 375/226 |

* cited by examiner

*Primary Examiner* — David C. Payne
*Assistant Examiner* — Zewdu Kassa
(74) *Attorney, Agent, or Firm* — Cool Patents, P.C.; Joseph P. Curtin

(57) ABSTRACT

A method and circuit for testing phase interpolators is provided. The method performs a sweep over a phase interpolator delay range and detects if the phase interpolators experience an unacceptably large non-linearity which leads to inaccurate clock timing. The testing circuit implementing this technique uses a phase detector to detect a fault, and in one embodiment, an additional phase interpolator is added as well.

20 Claims, 4 Drawing Sheets

TESTABILITY TECHNIQUE FOR PHASE INTERPOLATORS

BACKGROUND

Phase interpolators suffer from non-linearity, which can become unacceptably large in the presence of process variations and routing mismatches. These non-linearity errors result in inaccurate clock timing, and can go unnoticed in high-volume manufacturing (HVM). This results in wrong timing margining results or poor input/output (I/O) performance due to inaccurate timing training.

BRIEF DESCRIPTION OF THE DRAWINGS

The claimed subject matter will be understood more fully from the detailed description given below and from the accompanying drawings of disclosed embodiments which, however, should not be taken to limit the claimed subject matter to the specific embodiment(s) described, but are for explanation and understanding only.

DETAILED DESCRIPTION

Figure 1:
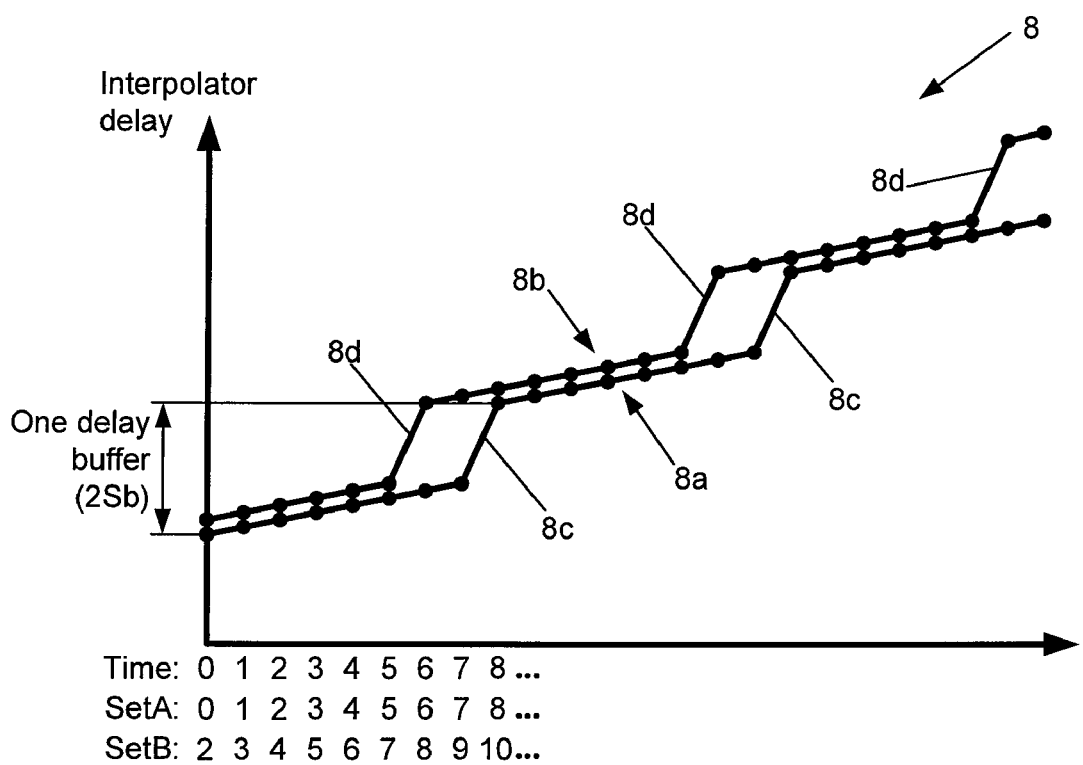
FIG. 1 is a plot of the timing relationship showing a conventional approach for testing two phase interpolators.

Referring to FIG. 1, a conventional approach for testing the linearity of a phase interpolator (also referred to as "PI" or "interpolator") is shown at 8, in which the timing relationship of two PIs is plotted. The method makes the two PIs walk through each state in parallel ("walking test"). One of them is always at one or more state(s) higher than the other while their delays are compared with a phase detector (flip/flop). If there is a linearity mismatch between the two PIs, the expected timing relationship will be violated. That is, the one PI expected to always be later than the other will become earlier at some point. This error will be detected by the phase detector and the PIs will be declared as faulty.

If, however, the two PIs have matched large non-linearity (as would be the case if the non-linearity is caused by global process variations), the delays through the interpolators will never cross. In a normal mode outside of testing, since the interpolators are used independently, this type of matched non-linearity will have a direct impact on timing and, therefore, on overall performance of the input/output (I/O). In FIG. 1, the X axis shows the states (time) as the PIs (A and B) are going through the walking test. SetA and SetB indicate the interpolator A and B settings (also "states") at each time point, respectively. In this example, the interpolator B is offset by 2 states. Curve 8a represents the timing of interpolator A, and curve 8b represents the timing of interpolator B. Large non-linearities on interpolators A and B, as indicated by 8c and 8d, respectively, are existent, but the timing relationships never cross. Therefore, the phase detector does not detect the error, and the PIs are not declared as faulty.

Figure 2:
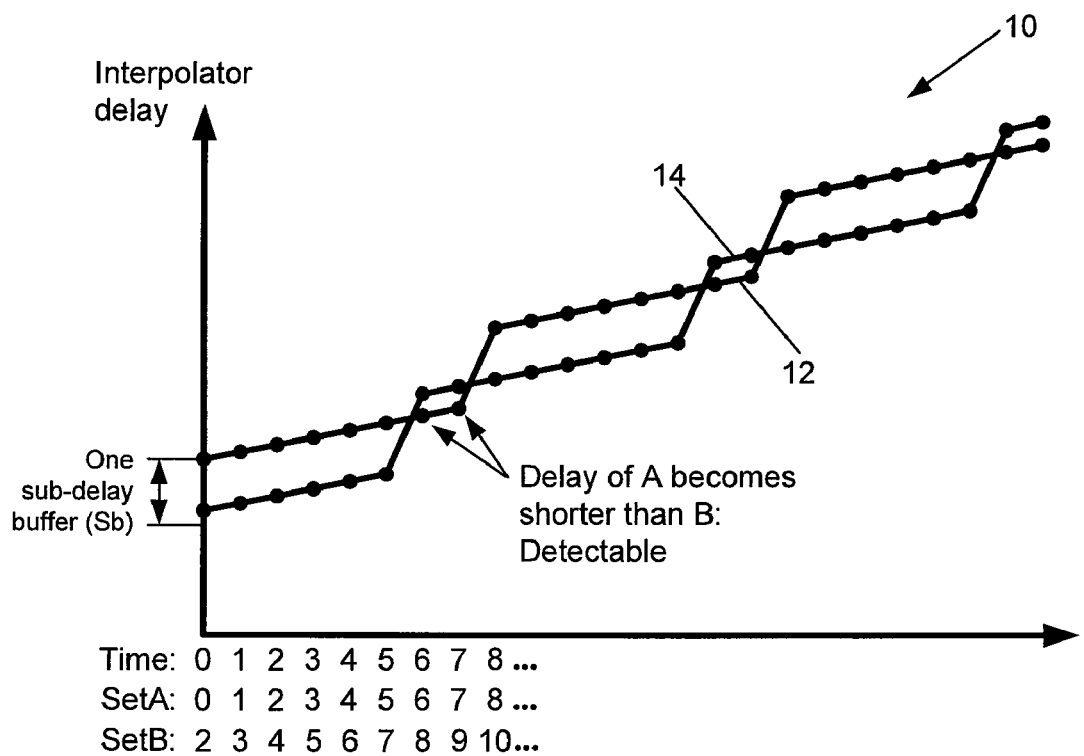
FIG. 2 is a plot of the timing relationship of two phase interpolators during testing according to one embodiment.

Referring now to FIG. 2, a timing diagram 10 of two phase interpolators is shown in accordance with one embodiment. Curve 12 corresponds to a first phase interpolator A, and curve 14 corresponds to a second phase interpolator B. Curve 14 may be shifted on the X axis by adding an offset to its setting. Curve 12 may be shifted on the Y axis by adding delay to the interpolator. Here, one sub-delay buffer is added to interpolator A, which for exemplary purposes is equivalent to one half of the delay buffer. One delay buffer is equal to one phase delay of a delay-locked loop (DLL). Similar to FIG. 1, a state offset of 2 is applied to the setting of interpolator B. Timing diagram 10 shows curves 12 and 14 crossing at time 6 and other later times due to the non-linearities. When the curves cross, such as when the delay of interpolator A is less than that of interpolator B, the phase detector will detect the defect and correctly declare the interpolators faulty. Either or both interpolators may be faulty and the chip is rejected.

The delay buffer and the state offset that is selected may be due, in part, to product and process variations. For example, by having a larger state offset and larger delay buffer, the detection of error is coarser (tolerance for error may be greater). The opposite is true in which fault detection may be finer (less tolerance) by using smaller state offsets and delay buffers.

It should be noted that the delay that is added to interpolator A may be added in an increment, such as one half, quarter, etc. of one delay buffer. Alternatively, the delay may be any value that is suitable to achieve the desired error detection. The selection of delay may be dependent on the implementation, as will be apparent below.

According to one embodiment, a method of testing a phase interpolator is provided. The approach offers two variables for adjusting the precision of the fault detection: the delay offset on a first phase interpolator and the state offset on a second phase interpolator. These adjustment variables may be used to make the test sensitive to non-linearity larger than a certain amount (to account for normal process variations). It should be noted that the test is capable of testing for slope mismatches as well.

A method of testing a phase interpolator includes applying a delay offset to a first phase interpolator and applying a state offset to a second phase interpolator coupled in parallel to the first phase interpolator. Output from the first phase interpolator and output from the second phase interpolator enter a phase detector. From receiving the phase detector output, the method determines if either or both the first phase interpolator and the second phase interpolator are faulty. When the timing relationships of the first phase interpolator and the second phase interpolator cross, such as when the first phase interpolator has a shorter delay than the second phase interpolator, a fault is triggered.

As mentioned above, the delay offset and the state offset are adjustable to tune the precision of fault detection. To create a state offset, the method may include a digital adder on an external high volume manufacturing tool or built-in to a testing circuit with the first phase interpolator, the second phase interpolator, and the phase detector. This is shown in more detail in FIG. 6.

Figure 3:
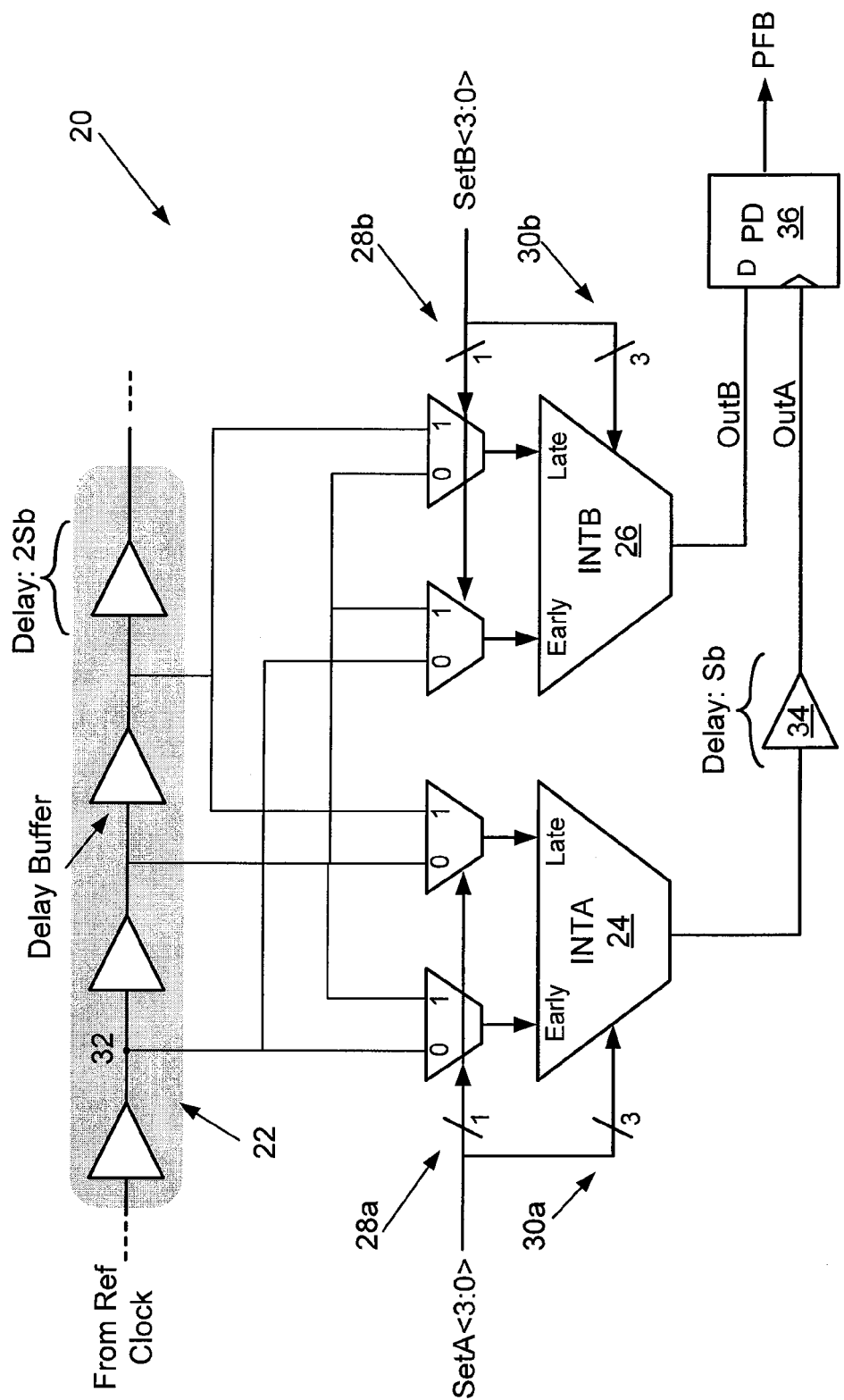
FIG. 3 is a circuit diagram according to one embodiment.
Figure 5:
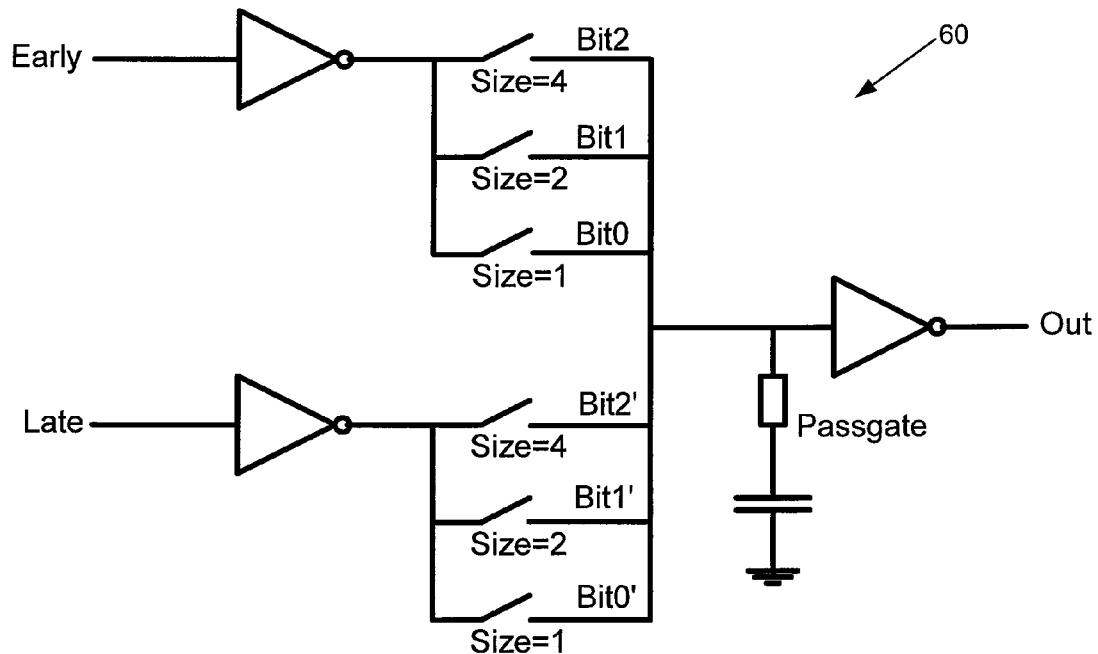
FIG. 5 shows a phase interpolator according to one embodiment.

FIG. 3 illustrates how this methodology can be implemented on a circuit 20 according to one embodiment. Circuit 20 includes a plurality of delay buffers in a DLL delay line 22. Each delay buffer may be calibrated with a predetermined delay, such as "2Sb". Two interpolators A (24) and B (26) are connected in parallel to the delay line 22. In the simplified schematic of FIG. 3, the interpolator 24 can select only among two phase pairs (1 bit) at 28a, and have 8 interpolation steps (3 bits) at 30a. Similarly, the interpolator 26 can select only among two phase pairs (1 bit) at 28b, and have 8 interpolation steps (3 bits) at 30b. More details of the exemplary interpolators are shown in FIG. 5. Alternatively, other types of phase interpolators may be used in the circuit.

A node 32 is used as a reference point for timing. Interpolator B (26) is configured with SetB, while Interpolator A (24) is configured with SetA. In this embodiment, SetB includes a setting offset of 2. The delay timing at the output from interpolator 26 ("OutB") will sweep from 2*(2Sb/8) to 4Sb, with a non-linearity jump at time 6 and at other points in time (in accordance with curve 14 on FIG. 2). Interpolator 24 includes a delay buffer 34 of Sb delay on its output. Because Interpolator 24 has an additional delay of Sb, the delay timing at the output from interpolator 24 ("OutA") goes from Sb to 5Sb. Signals OutB and OutA are inputted into a phase detector (PD) 32, which will generate a 0 (fail) at points in time where the curves cross. The resulting timing curves are illustrated in FIG. 2. It should be noted that delay offset may be varied in small steps which may or may not be in set increments.

Figure 4:
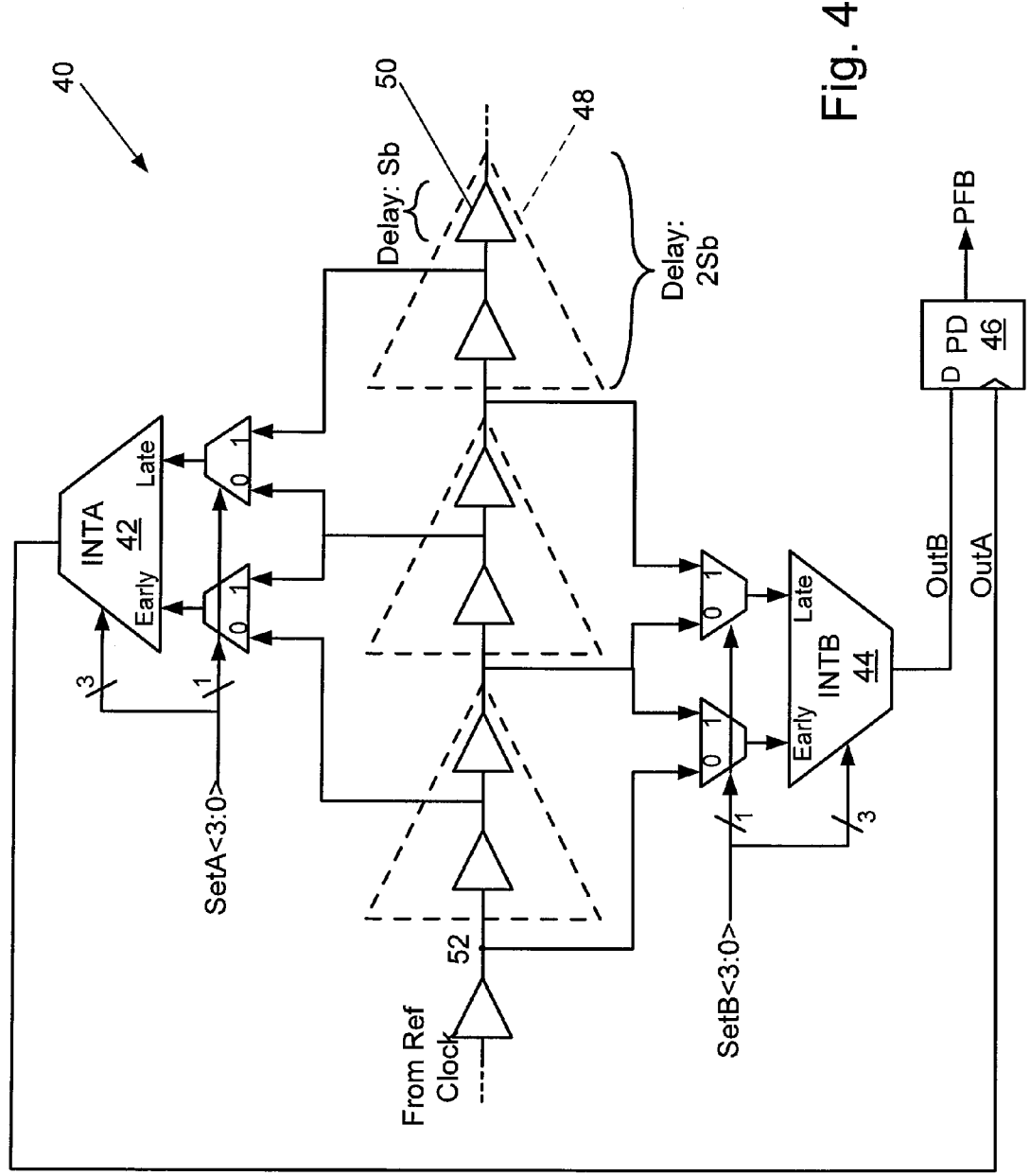
FIG. 4 is a circuit diagram according to one embodiment.

Referring to FIG. 4, one embodiment of a circuit is shown at 40. Similar to circuit 20, circuit 40 includes an interpolator 42 and an interpolator 44 coupled to a phase detector 46. Interpolator 42 receives an input SetA and interpolator 44 receives an input SetB. SetB may be configured with a state offset of 2. The delay buffers 48 are coupled to interpolator 42 and interpolator 44 differently from the implementation of FIG. 3.

As shown, in some DLL implementations used in products, the delay buffers are made of two sub-delay buffers 50. One or more of the sub-delay buffers may be calibrated to a delay of Sb with a phase delay of 2Sb (equal to one delay buffer). A node 52 is used as a reference point for timing. The signal timing at OutB will be identical to the implementation of FIG. 3. Because interpolator 42 is wired at the internal nodes inside the delay buffers, it is offset in time by Sb. This will cause its delay timing at OutA to go from Sb to 5Sb. The signal timing at OutA will also be identical to the implementation of FIG. 3. It should be noted that the delay offset is adjustable in steps of Sb in this implementation.

Regarding the embodiments shown in FIGS. 3 and 4, some circuits operate normally with one interpolator. In order to test those circuits, one interpolator and one phase detector should be added to the test circuit. The two interpolators are used in the test, but the device under test is the interpolator that was in the circuit originally. In circuits that operate normally with two interpolators, only one phase detector should be added to the test circuit. The two interpolators are used in the test, and the device being tested is the two interpolators.

In FIG. 5, a simplified schematic of an exemplary phase interpolator is shown at 60. Here, faults were injected into interpolator 60 to triple the size of the most significant bit (MSB) transmission gates (Bit2 and Bit2') and increase the size of the other transmission gates by 20%. This results in a non-linearity comparable to what is shown in FIGS. 1 and 2. Simulation results also corresponded to FIG. 1 when using the conventional approach and 2 when using one embodiment, and phase detector output PFB changes to 0 (fail) when the timing crosses.

Figure 6:
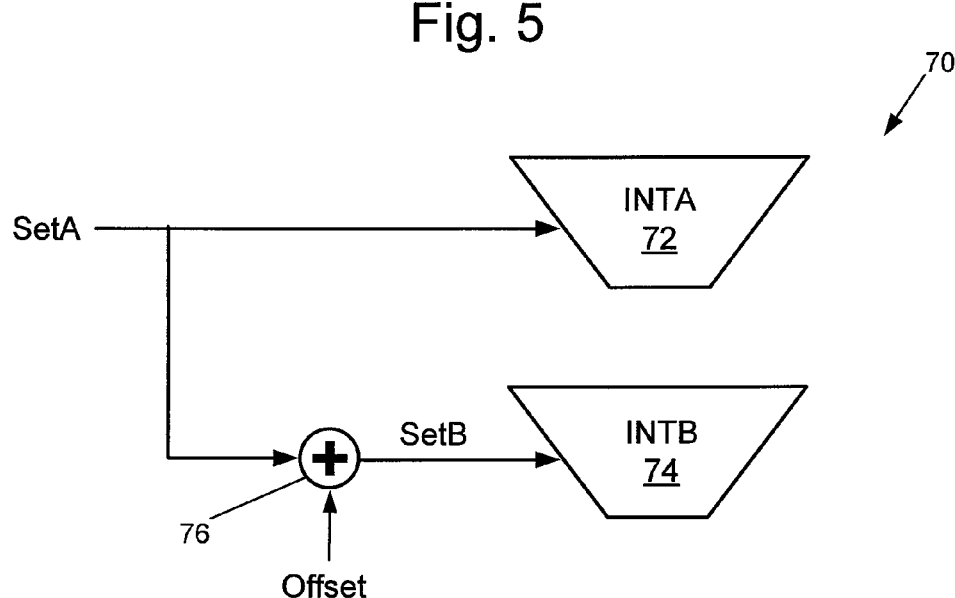
FIG. 6 is a simplified schematic of a digital adder for use with two phase interpolators according to one embodiment.

Referring next to FIG. 6, in accordance with one embodiment, the state offset may be implemented by a digital adder, as shown by the simplified schematic at 70. The input SetA to interpolator A 72 also enters digital adder 76 which generates SetB, an input to interpolator B 74. In essence, the digital adder adds a predetermined state offset to SetA. As mentioned previously, this offset may be selected based on desired tolerance and product or process variations. The digital adder may be used with both circuit 20 of FIG. 3 and circuit 40 of FIG. 4. As mentioned above, the digital adder may be at the HVM tool or built into the testing circuit.

It is appreciated that the design for testability technique for phase interpolators has been explained with reference to one general exemplary embodiment, and that the disclosed subject matter is not limited to the specific details given above. References in the specification made to other embodiments fall within the scope of the claimed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the claimed subject matter. The various appearances of "an embodiment," "one embodiment" or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the claimed subject matter. Indeed, the invention is not limited to the details described above. Rather, it is the following claims including any amendments thereto that define such scope and variations.

What is claimed is:

1. A circuit for testing a phase interpolator, comprising:
a first phase interpolator comprising a first input, a second input and an output, the first and second inputs of the first phase interpolator being coupled to delay buffers in a delay locked loop (DLL) delay line;
a second phase interpolator comprising a first input, a second input and an output, the first and second inputs of the second phase interpolator being coupled to the delay buffers in the DLL delay line; and
a phase detector comprising a first input coupled to receive the output from the first phase interpolator and a second input coupled to receive the output from the second phase interpolator, the phase detector further comprising a fault-detection output that indicates when an output signal of the first phase interpolator crosses in time with an output signal of the second phase interpolator;
wherein the first and second inputs of the first phase interpolator and the first and second inputs of the second phase interpolator are coupled to the DLL delay line;
wherein the first phase interpolator comprises a predetermined delay offset with respect to a delay offset of the second phase interpolator, and the second phase interpolator comprises a predetermined state offset with respect to a state of the first phase interpolator.

2. The circuit of claim 1, wherein the predetermined delay offset is adjusted to tune a precision of the fault-detection output.

3. The circuit of claim 1, wherein the predetermined state offset is adjusted to tune a precision of the fault-detection output.

4. The circuit of claim 1, further comprising a delay buffer located between the output of the first phase interpolator and the first input of the phase detector.

5. The circuit of claim 1, further comprising a digital adder coupled to the second phase interpolator that is capable of creating the predetermined state offset of the second phase interpolator.

6. The circuit of claim 1, wherein the respective inputs to the first phase interpolator and to the second phase interpolator are coupled in parallel.

7. The circuit of claim 1, wherein the delay buffers comprise two sub-delay buffers.

8. The circuit of claim 7, wherein the first phase interpolator is coupled to internal nodes inside the delay buffers.

9. The circuit of claim 2, wherein the predetermined state offset is adjusted to tune a precision of the fault-detection output.

10. The circuit of claim 9, further comprising a delay buffer located between the output of the first phase interpolator and the first input of the phase detector.

11. The circuit of claim 10, further comprising a digital adder coupled to the second phase interpolator that is capable of creating the predetermined state offset of the second phase interpolator.

12. The circuit of claim 11, wherein the respective inputs to the first phase interpolator and to the second phase interpolator are coupled in parallel.

13. The circuit of claim 12, wherein the delay buffers comprise two sub-delay buffers.

14. A method of testing a phase interpolator, comprising:
    applying a first delay offset to a first phase interpolator, the first delay offset being with respect to a second delay of a second phase interpolator;
    applying a first state offset to the second phase interpolator, the first state offset of the second phase interpolator being with respect to a second state offset of the first phase interpolator;
    applying an output from the first phase interpolator to a first input of a phase detector and an output from the second phase interpolator to a second input of the phase detector; and
    outputting a fault-detection signal from the phase detector indicating when an output signal of the first phase interpolator crosses in time with an output signal of the second phase interpolator.

15. The method of claim 14, wherein the first delay offset is adjustable to tune a precision of fault-detection signal.

16. The method of claim 14, wherein the first state offset is adjustable to tune a precision of fault-detection signal.

17. The method of claim 14, further comprising implementing the first state offset by coupling an output of a digital adder to the second phase interpolator.

18. The method of claim 17, wherein the digital adder is on a high volume manufacturing tool.

19. The method of claim 17, wherein the digital adder is built-in to a testing circuit.

20. The method of claim 14, wherein inputs of the first phase interpolator and inputs of the second phase interpolator are coupled in parallel.

* * * * *

UNITED STATES PATENT AND TRADEMARK OFFICE
CERTIFICATE OF CORRECTION

| | | |
|---|---|---|
| PATENT NO. | : 7,907,661 B2 | Page 1 of 1 |
| APPLICATION NO. | : 11/940205 | |
| DATED | : March 15, 2011 | |
| INVENTOR(S) | : Benoit Provost | |

It is certified that error appears in the above-identified patent and that said Letters Patent is hereby corrected as shown below:

On the Title Page, in Item (74), in (Attorney, Agent, or Firm), in column 2, line 1, delete "Cool Patents," and insert -- Cool Patent, --, therefor.

Signed and Sealed this

Seventeenth Day of May, 2011

David J. Kappos
*Director of the United States Patent and Trademark Office*